United States Patent

[11] 3,580,355

| [72] | Inventors | Yasushi Kitano<br>Osaka;<br>Kozo Fujita, Kyoto, Japan |
|---|---|---|
| [21] | Appl. No. | 695,419 |
| [22] | Filed | Jan. 3, 1968 |
| [45] | Patented | May 25, 1971 |
| [73] | Assignee | Matsushita Electric Industrial Co., Ltd.<br>Osaka, Japan |
| [32] | Priority | Jan. 13, 1967, Jan. 13, 1967, Jan. 16, 1967, Feb. 21, 1967, Aug. 15, 1967, Nov. 16, 1967, Nov. 16, 1967 |
| [33] | | Japan |
| [31] | | 42/2869, 42/2870, 42/3551, 42/11663, 42/52814, 42/74123 and 42/74124 |

[54] AUTOMATIC SPEED CONTROL APPARATUS FOR AUTOMOTIVE VEHICLES
9 Claims, 14 Drawing Figs.

[52] U.S. Cl. .................................................. 180/105, 123/102
[51] Int. Cl. ...................................................... B60k 31/00
[50] Field of Search .......................................... 123/102
(Cursory), (Inquired); 180/105—109

[56] References Cited
UNITED STATES PATENTS

| 3,116,807 | 1/1964 | Wilson | 180/109 |
| 3,447,624 | 6/1969 | Balan et al. | 180/105 |
| 3,172,497 | 3/1965 | Stoner | 123/102X |
| 3,381,771 | 5/1968 | Granger et al. | 123/102 |
| 3,406,775 | 10/1968 | Magnuski | 123/102X |
| 3,409,102 | 11/1968 | Neapolitakis et al. | 123/102X |

*Primary Examiner*—Kenneth H. Betts
*Attorney*—Stevens, Davis, Miller & Mosher

ABSTRACT: An apparatus for the steady drive of an automotive vehicle at a predetermined speed setting, having a comparison means for comparing a signal representative of the vehicle running speed with a reference signal representative of the predetermined speed setting and a control means for driving a drive motor output regulator in a speed correcting direction depending on the difference between these two signals. In the apparatus, a third signal is introduced to shift the value of the difference signal and this shifted signal is used to attain the desired stabilization of the running condition of the vehicle.

AUTOMATIC SPEED CONTROL APPARATUS FOR AUTOMOTIVE VEHICLES

This invention relates to an automatic speed control apparatus for automotive vehicles which controls the operation of a device for regulating the output of a drive motor such as an engine so as to maintain the running speed of the vehicle at a predetermined speed setting.

A prior method of automatic speed control employed in apparatus of this kind comprised detecting the running speed of an automotive vehicle for deriving a signal representative of the running speed of the automotive vehicle, comparing the detected signal with a signal representative of a predetermined speed setting in order to detect the difference therebetween, and moving the drive motor output regulating means in a speed correcting direction depending on the value of the difference so detected. However, with such a method of control, there was inevitably a certain delay in time before the vehicle could run at the desired speed setting after the necessary regulation was imparted to the drive motor output, and in such a method, no compensation for the above factor of delay was effected. In view of the above manner of control, it has been difficult to effect the desired control under a stable and comfortable feeling of drive in those automotive vehicles in which the factor of delay is considerably great.

A prior apparatus of the kind which is so constructed as to compensate for such a factor of delay has also been defective in that the vehicle running speed does not always coincide with a predetermined speed setting and an error therebetween results frequently from various factors affecting the running conditions including a slope of the road, the number of persons carried by the vehicle, an amount of load, and the direction of wind.

The present invention is intended to solve the above problems and has for its primary object to provide an automatic speed control apparatus for automotive vehicles which is so arranged that a signal responsive to the running speed and/or a reference signal having a fixed magnitude are varied in accordance with a predetermined speed setting and, after deriving an error signal representing the difference therebetween, a third signal is introduced in order to shift the value of the error signal, the shifted signal being employed as the control signal for effecting the desired stabilization of the vehicle running condition.

Another object of the present invention is to provide an automatic speed control apparatus of the above character in which a variation in the operating position of drive motor output regulating means is detected to obtain a third signal as described above so as to effect the desired stabilization of the vehicle running condition.

A further object of the present invention is to provide an automatic speed control apparatus of the above character in which the means for detecting a variation in the operation of the drive motor output regulating means includes a converter for converting the movement of the regulating means into a varying voltage which is then applied across a capacitor to be derived as a signal so that such a signal may be used for the desired stabilization of the vehicle running condition.

Another object of the present invention is to provide an automatic speed control apparatus of the above character in which acceleration of the vehicle running speed is utilized to derive a third signal as described above so as to effect the desired stabilization of the vehicle running condition.

Still another object of the present invention is to provide an automatic speed control apparatus of the above character in which the above signal representative of acceleration of the vehicle running speed is derived by differentiating the vehicle running speed so that this signal may be used to effect the desired stabilization of the vehicle running condition.

Yet another object of the present invention is to provide an automatic speed control apparatus of the above character in which the means for converting a variation in the operating position of the drive motor output regulating means into a varying voltage includes a light source, photoelectric converting means for converting the quantity of light from the light source into a voltage such, for example, as means employing a cadmium sulfide (CdS) cell, and light shielding means for varying the quantity of light emitted from the light source toward the photoelectric-converting means depending on the operating position of the drive motor output regulating means so that the movement of the regulating means can be converted into a varying voltage and this voltage is applied across a capacitor to be derived as a signal which is used for effecting the desired stabilization of the vehicle running condition.

A further object of the present invention is to provide an automatic speed control apparatus of the above character in which both an acceleration of the vehicle running speed and a variation in the operating position of the drive motor output regulating means are utilized to obtain a third signal as described above so as to effect the desired stabilization of the vehicle running condition.

A still further object of the present invention is to provide an automatic speed control apparatus of the above character in which a signal representative of the vehicle running speed and/or a reference signal having a fixed magnitude are varied in accordance with a predetermined speed setting and, after deriving an error signal representing the difference therebetween, a third signal is introduced in order to vary or shift the value of the error signal for use as the control signal, while at the same time, the control speed of control means for the drive motor output regulating means is varied depending on a signal derived from the vehicle running speed for thereby effecting the desired stabilization of the vehicle running condition.

A yet further object of the present invention is to provide an automatic speed control apparatus of the above character in which the desired control of the control speed for the drive motor output regulating means depending on a signal derived from the vehicle running speed is attained by means of varying the control speed by the value of a signal obtained by shifting an error signal representing the difference between the vehicle running speed and a predetermined speed setting for thereby effecting the desired stabilization of the vehicle running condition.

Another object of the present invention is to provide an automatic speed control apparatus of the above character in which the desired control of the control speed for the drive motor output regulating means depending on a signal derived from the vehicle running speed is attained by means of detecting acceleration of the vehicle running speed and varying the control speed depending on the magnitude of the acceleration for thereby effecting the desired stabilization of the vehicle running condition.

Still another object of the present invention is to provide an automatic speed control apparatus of the above character in which the desired control of the control speed for the drive motor output regulating means depending on a signal derived from the vehicle running speed is attained by means of varying the control speed by both the value of acceleration of the vehicle running speed and the value of a signal obtained by shifting an error signal representing the difference between the vehicle running speed and a predetermined speed setting for thereby effecting the desired stabilization of the vehicle running condition.

The above and other objects, advantages and features of the present invention will become apparent from the following description of preferred embodiments of the present invention taken in conjunction with the accompanying drawings, in which.

Figure 1:
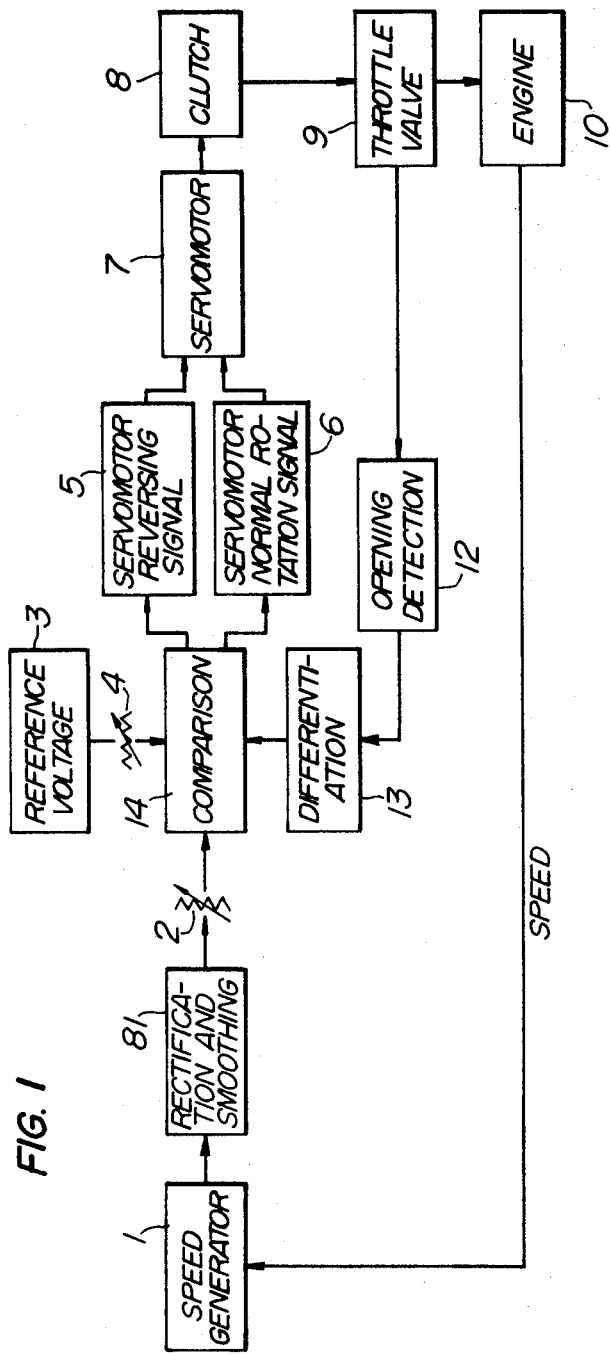
FIG. 1 is a block diagram illustrating an embodiment of the apparatus according to the present invention.

Referring now to FIG. 1, an embodiment of the automatic speed control apparatus according to the present invention includes a speed generator 1 which generates an AC voltage representing the running speed of an automotive vehicle. The speed generator 1 is mounted on a speed takeoff portion for a speed meter of the transmission of the vehicle. The AC voltage responsive to the running speed of the vehicle generated by the speed generator 1 is then converted into a DC voltage corresponding to the vehicle running speed by a rectification and smoothing means 81, the DC voltage being then applied to an attenuator 2. A reference voltage generator 3 generates a fixed voltage which is applied to an attenuator 4. A speed setting is obtained by varying the resistance of at least one of the attenuators 2 and 4. The output from the attenuator 2 constitutes a first signal representative of the vehicle running speed, while the output from the attenuator 4 constitutes a second or reference signal. The first signal and the second signal are compared with each other in a comparison means 14 which detects the difference between these signals. When the first signal is larger than the second signal, a servomotor reversing signal is generated from the comparison means 14 to drive a servomotor reversing means 5 which acts to rotate a servomotor 7 in the reverse direction, while when the first signal is smaller than the second signal, a servomotor normal rotation signal is generated to drive a servomotor normal rotation means 6 which acts to rotate the servomotor 7 in the normal direction. No signal is delivered from the comparison means 14 when the first signal is entirely or substantially equal to the second signal.

The servomotor 7 is operative to actuate a throttle valve 9 in the fuel supply system through a suitable reduction gearing and a clutch 8 of the automotive vehicle. The clutch 8 connects the servomotor 7 and the throttle valve 9 when the apparatus of the present invention is placed in operation. However, when the apparatus is not in operation, the clutch 8 does not connect them, and therefore the throttle valve 9 is free from the servomotor 7. Accordingly, the clutch 8 is in its released state when the apparatus of the present invention is not placed in operation, and the automotive vehicle can be driven by suitable control of the accelerator in a conventional manual manner. The operation of the servomotor 7 is such that its normal rotation urges the throttle valve 9 in the opening direction and its reverse rotation urges the throttle valve 9 in its closing direction. The output of a drive motor or engine 10 is varied depending on the opening or operating position of the throttle valve 9 and the resultant output determines the speed of the vehicle. An opening detector 12 detects the opening of the throttle valve 9 and is operative to convert the opening or operating position of the throttle valve 9 into a signal such, for example, as a voltage signal. This voltage, which is used as a third signal, is passed through an electrical differentiation means 13 to be fed back to the comparison means 14. The manner of application of the feedback voltage is such that, as the throttle valve 9 is urged in its opening direction, the voltage is applied in a direction which is apparently equivalent to the direction in which the first signal makes an increase. Since this feedback voltage becomes zero after a predetermined period of time which is determined by the time constant of the electrical differentiation means 13, the first and the second signal are not affected by the third signal in the normal steady running state of the vehicle.

Figure 2:
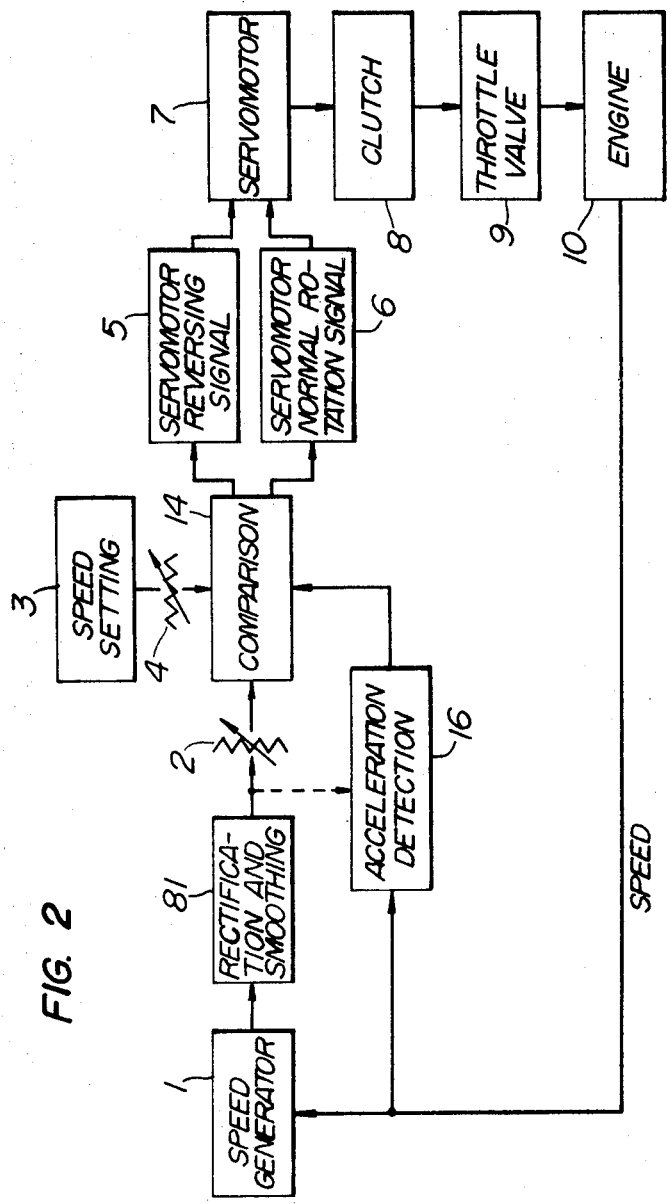
FIG. 2 is a block diagram illustrating another embodiment of the apparatus according to the present invention.

In another embodiment of the present invention shown in FIG. 2 in which like reference numerals are used to denote like parts appearing in FIG. 1, the value of the vehicle speed is supplied to an acceleration detector 16, which detects the acceleration of the vehicle speed and supplies the value of the acceleration to a comparison means 14 as a third signal. When the acceleration is positive, the third signal is applied to the comparison means 14 in a direction which is apparently equivalent to the direction in which a first signal derived from an attenuator 2 makes an increase, while when the acceleration is negative, the third signal is applied in a direction which is apparently equivalent to the direction in which the first signal makes a decrease. The effect similar to the above may be obtained by applying both the result of detection of the opening of the throttle valve 9 and the result of detection of the acceleration to the comparison means 14 as the third signal. The acceleration detection may be effected by deriving a DC voltage proportional to the vehicle speed, that is, the output of a rectification and smoothing means 81 by way of a path shown by a dotted line in FIG. 2 and then differentiating the DC voltage.

Figure 3:
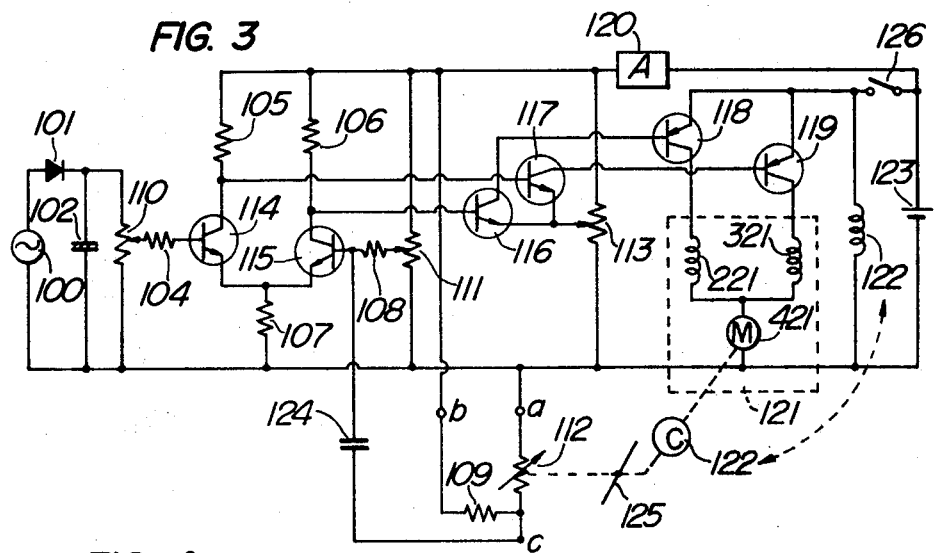
FIG. 3 is a practical circuit diagram of the apparatus shown in FIG. 1.

FIG. 3 illustrates a practical circuit diagram of the apparatus of the present invention shown in FIG. 1. A servomotor 121 is adapted to rotate in the reverse direction when a current flows through a field coil 221 and an armature 421, and to rotate in the normal direction when a current flows through a field coil 321 and the armature 421. When a switch 126 in the control system is in its on position, the servomotor 121 is connected through an electromagnetic clutch 122 with the open-close mechanism of a throttle valve 125 in the fuel supply system so that the normal rotation of the servomotor 121 urges the throttle valve 125 to move in its opening direction to thereby accelerate the vehicle and the reverse rotation of the servomotor 121 urges the throttle valve 125 to move in its closing direction to thereby decelerate the vehicle. The throttle valve 125 is so connected with a variable resistor 112 that the resistance value of the variable resistor 112 decreases in response to the movement of the throttle valve 125 in its opening direction and increases in response to the movement of the throttle valve 125 in its closing direction. A battery 123 in the electric system of the vehicle supplies the electrical power required by the apparatus, and a constant voltage means 120 is connected to the battery 123 in order to supply a fixed voltage to those portions which require an accurate voltage value for their proper operation.

During the running of the vehicle, a speed generator 100 generates an AC output voltage representative of the vehicle speed, which voltage is rectified and smoothed by a diode 101 and a capacitor 102 and is then divided by a variable resistor 110, which serves as a speed setting means, to appear as a first signal. This first signal is applied to the base of a transistor 114 through a resistor 104. Transistors 114 and 115, and resistors 105, 106 and 107 constitute a differential amplifier. A reference voltage which is determined by the value of voltage division by a variable resistor 111 is applied, as a second signal, through a resistor 108 to the base of the transistor 115 which is one of the transistors constituting the differential amplifier described above. The differential amplifier constitutes a comparison circuit for comparing the first signal with the second signal, and the differential amplifier is in its balanced state when the first signal and the second signal have an equal value. Since both the transistors 114 and 115 are in their on state under the balanced state of the differential amplifier, collector current of a certain value flows through each of the transistors 114 and 115 to cause voltage drops across the respective resistors 105 and 106, with the result that the collector voltages of the transistors 114 and 115 are reduced to a certain value. Transistors 116 and 117 whose bases are supplied with these collector voltages of the respective transistors 115 and 114 are both in their off state since a variable resistor 113 is suitably set so that their emitter voltages are slightly higher than the base voltages thereof. In other words, both the transistors 116 and 117 are in their off state whenever the differential amplifier is in its balanced state.

Suppose now that the vehicle is about to run on, for example, a downward slope and the vehicle speed is thereby increased. Then, the first signal becomes larger than the second signal and the differential amplifier is urged to its unbalanced state so that an increased collector current flows through the transistor 114. This results in a decrease in the collector current of the transistor 115 due to the function of differential amplification. As a result, the collector voltage of the transistor 114 is reduced, but the succeeding transistor 117 remains in its off state due to the fact that the bias voltage to drive the transistor 117 in the off direction is merely increased. On the other hand, the collector voltage of the transistor 115 is increased and the succeeding transistor 116 is urged to its on state due to the fact that a base current flows into the transistor 116. Accordingly, a transistor 118 connected to the transistor 116 is urged to its on state while a transistor 119 connected to the transistor 117 remains in its off state.

Under such a situation, a current flows through the field coil 221 and the armature 421 of the servomotor 121, which is thereby rotated in the reverse direction to urge the throttle valve 125 in its closing direction. Thus, the throttle valve 125 is moved in its closing direction whenever the first signal becomes larger than the second signal due to an increase in the vehicle speed, that is, whenever the vehicle speed exceeds the reference value. The movement of the throttle valve 125 in its closing direction causes the following operation of associated elements. The movement of the throttle valve 125 in its closing direction causes first an increase in the resistance value of the variable resistor 112 due to the fact that the resistor 112 is so interconnected with the throttle valve 125. As a result, the voltage appearing across the variable resistor 112 is increased, and the increment in the voltage is applied, as a third signal, through a capacitor 124, which acts as an electrical differentiation means, to the second signal side of the differential amplifier thereby raising the voltage on such side of the differential amplifier. Therefore, the balance point (the input voltage to the base of the transistor 114 which is required to bring forth the balanced state) of the differential amplifier is gradually raised until finally the value of the second signal equals the value of the first signal, at which time the differential amplifier is restored to its balanced state, the transistor 119 is driven to its off state, the servomotor 121 ceases its rotation, and the throttle valve 125 ceases its closing movement. In case the vehicle speed continues to make a further increase, the voltage of the first signal is further increased to urge the differential amplifier to its' unbalanced state again. At the servomotor 121 urges the throttle valve 125 in the closing direction to a greater degree in order to further reduce the engine output thereby trying to restore the vehicle speed to the predetermined speed setting. The third signal is likewise applied to the second signal side of the differential amplifier to reestablish the balanced state in the differential amplifier and to thereby stop the further closing movement of the throttle valve 125. The intermittent operation for urging the throttle valve 125 in its closing direction is repeated so long as the vehicle speed tends to increase persistently.

It will be understood that, with a greater rate of increase in the vehicle speed, that is, with a greater acceleration, the third signal for restoring the differential amplifier to its balanced state must have a correspondingly higher value, so that the closing stroke of the throttle valve 125 in one unbalanced state of the differential amplifier becomes correspondingly greater. Therefore, the mean speed of the intermittently moving throttle valve 125 becomes higher as the acceleration of the vehicle speed becomes greater, and consequently the mean moving speed of the throttle valve 125 can be controlled in proportion to the acceleration of the vehicle speed. It will thus be understood that, when the vehicle runs on, for example, a steep downward slope and the vehicle speed becomes considerably higher than the predetermined speed setting, the throttle valve 125 is closed to its zero throttle position in response to appearance of an unbalanced state in the circuit including the differential amplifier to thereby impart a maximum engine brake to the vehicle. When the differential amplifier is held in its balanced state for a considerable time due to a few consecutive closing operations of the throttle valve 125 in the manner described above, the third signal is gradually diminished in accordance with the time constant which is determined by the values of those elements including the capacitor 124, resistor 109 and variable resistor 112, and finally the third signal is no more applied to the transistor 115, with the result that the balance point of the differential amplifier is restored to its original value. The closing operation of the throttle valve 125 similar to that described above will be repeated again if the first signal is still larger than the second signal in the course of the restoration of the balance point or at a time when the balance point has been restored to its original value. It is to be noted that the tendency of gradual decrease of the third signal in accordance with the time constant specified above is always present not only in the balanced state of the circuit including the differential amplifier but also in the course of generation of the third signal.

Consider then a case in which the vehicle begins to run on an upward slope and the vehicle speed is thereby reduced. In such a case, the first signal becomes smaller than the second signal and an operation entirely converse to the above-described operation takes place. More precisely, the collector current of the transistor 114 in the differential amplifier decreases so that the transistor 117 is urged to its on state and the transistor 119 is also urged to its on state. As a result, current now flows through the field coil 321 and the armature 421 of the servomotor 121, which is thereby rotated in the direction of normal rotation to open the throttle valve 125 to a wider degree for accelerating the vehicle. In the above operation, the transistors 116 and 118 remain in their off state. It will thus be understood that the throttle valve 125 is moved in its opening direction to accelerate the vehicle whenever the first signal becomes smaller than the second signal, that is, whenever the vehicle speed becomes lower than the predetermined reference value.

The resistance value of the variable resistor 112 interconnected with the throttle valve 125 is necessarily decreased due to the movement of the throttle valve 125 in its opening direction, with the result that the voltage on the second signal side of the differential amplifier is reduced to cause gradual lowering of the balance point of the differential amplifier to such an extent that the balance point equals the first signal, at which time the differential amplifier is balanced to stop any further opening movement of the throttle valve 125. The amount of shifting of the balance point of the differential amplifier is determined by a variation in the resistance value of the resistor 112 and by the values of the resistors 109, 112 and the capacitor 124. It will therefore by apparent that the third signal proportional to a variation of the resistance value of the variable resistor 112 relative to a variation of the operating position of the throttle valve 125 exercises a small influence and a large influence on the first and second signals when the resistance value of the variable resistor 112 is arranged to vary to a small degree and to a large degree, respectively, relative to a variation of the operating position of the throttle valve 125. It is therefore possible, by suitably selecting the relative magnitudes of the first, second and third signals, to obtain a stable vehicle speed control characteristic at whatever road conditions including a flat road, an upward slope and a downward slope irrespective of such factors as wind and the number of persons and a load carried by the vehicle.

Figure 4:
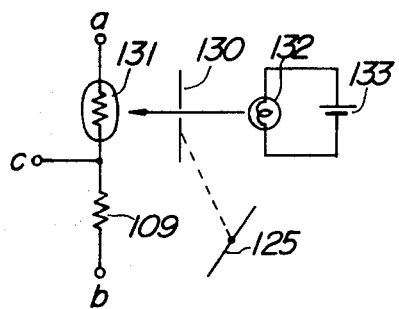
FIG. 4 is a circuit diagram illustrating another form of the means for detecting the operating position of drive motor output regulating means in the apparatus shown in FIG. 3.
Figure 5:
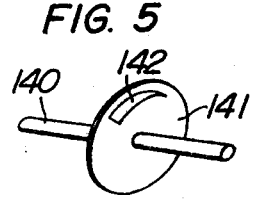
FIG. 5 is a schematic perspective view showing the practical structure of a part of the position detecting means shown in FIG. 4.

In a partial modification shown in FIGS. 4 and 5, the variable resistor 112 interconnected with the throttle valve 125 is replaced by a light shielding plate 141, which is provided with a suitable slit 142 and is mounted on a rotary shaft 140 used for the open-close control of the throttle valve 125 so that the light shielding plate 141 is rotated in either direction depending on the movement of the throttle valve 125 in its opening or closing direction. The light shielding plate 141 as it rotates in either direction increases or decreases the quantity of light reaching a cadmium sulfide (CdS) cell 131 from a light source 132 energized by a battery 133. Since the resistance value of the cadmium sulfide cell 131 varies corresponding to the quantity of light projected thereon, hence, the opening of the throttle valve 125, it is possible to optically detect the opening or operating position of the throttle valve 125, and this arrangement is advantageous over the arrangement employing the variable resistor in that an elongated service life can be expected. In the practice of the above arrangement, the cadmium sulfide cell 131 disposed between points $a$ and $c$ in FIG. 4 may merely be substituted for the variable resistor 112 disposed between points $a$ and $c$ in FIG. 3.

Practical numerical values of the elements in the embodiment shown in FIG. 3 will be described by way of example. The battery 123 is a conventional battery of a 12-volt rating mounted on the vehicle, and those portions in the preceding stage of the circuit which especially require a precisely fixed voltage for their proper operation are always supplied with a fixed voltage of 9 volts by the constant voltage means 120 which is operative to set the voltage at the above-specified value in spite of a voltage swing between 10 volts and 16 volts in the battery 123. The DC voltage obtained by the rectification and smoothing of an AC voltage generated by the speed generator 100 is 25 at a vehicle speed of 60 kilometers per hour, and the generated voltage is substantially proportional to the vehicle speed.

The DC voltage thus derived is divided by the vehicle speed setting variable resistor 110 which is set at a position at which an output voltage of 4 volts is obtained at the predetermined speed setting, the output voltage being applied to the base of the transistor 114 in the differential amplifier through the resistor 104. On the other hand, the variable resistor 111 giving the reference voltage acts to divide the previously described constant voltage of 9 volts into an output voltage of 4 volts, which is applied to the base of the transistor 115 in the differential amplifier through the resistor 108. Accordingly, the differential amplifier is in its balanced state when the vehicle is running at the predetermined speed setting. The input voltage to drive the differential amplifier to its unbalanced state thereby urging the transistor 116 or 117 in the succeeding stage to its on state may freely be designed to have any desired value. In the present embodiment, the design is such that the differential amplifier is turned into an unbalanced state to cause actuation of the throttle valve 125 thereby restoring the vehicle speed to the predetermined speed setting when a speed variation in the order of 1 kilometer per hour is developed at the vehicle speed of 60 kilometers per hour.

The magnitude of the third signal applied to the transistor 115 in a superposed relation with the second signal depending on the movement of the throttle valve 125 is arranged to vary from about 2 volts to about 5 volts relative to the variation of the throttle valve 125 from its zero throttle position to its full throttle position, and the time during which the third signal is reduced to the predetermined value, hence, the time constant may preferably be in the order of 10 seconds.

The magnitude of the third signal and the value of the time constant may suitably be determined to suit the performance, especially the accelerability of a specific automotive vehicle. Further, although the rate at which the throttle valve 125 is moved by the servometer 121 is so determined that the throttle valve 125 can continuously be moved from its throttle position by the servomotor 125 within a time in the order of 10 seconds, the rate of movement of the throttle valve 125 may suitably be varied to suit the performance of a particular automotive vehicle.

The speed control apparatus having the above-specified control conditions was mounted on an automotive vehicle having an overall piston displacement of 1,500cc. The vehicle exhibited an entirely satisfactory constant-speed running characteristic on a flat road which could not normally be expected with manual control, and exhibited an entirely satisfactory responsiveness and constant-speed running characteristic even on an upward slope and a downward slope. Further, even with an external disturbance to the vehicle speed due to running on an upward slope or a downward slope or with a variation of the speed setting during running, any hunting in the vehicle speed due to hunting in the control was not observed and the vehicle showed an excellent ability to remarkably smoothly recover and approach the speed setting.

Figure 7A:
FIG. 7a, FIG. 7b and FIG. 7c are graphs illustrating a manner of operation of the apparatus shown in FIG. 3.
Figure 7B:
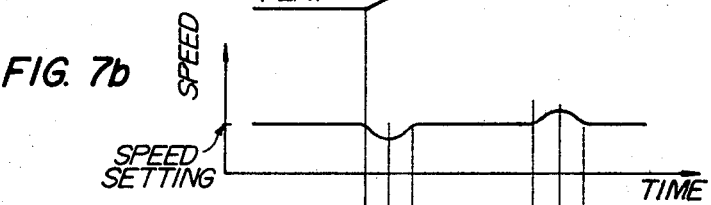
Figure 7C:
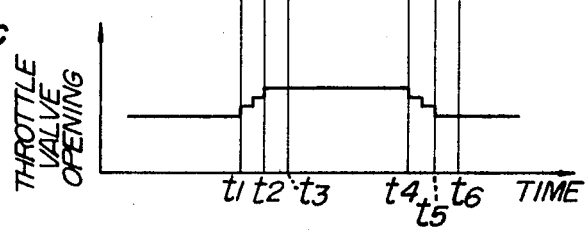

The excellent performance described above will be explained with reference to the graph shown in FIGS. 7$a$, 7$b$ and 7$c$. FIG. 7$a$ shows the state of a road which includes a first flat portion followed by an upward slope which is then followed by a second flat portion. FIG. 7$b$ shows the state of variation of the vehicle speed when the vehicle runs on the road of the kind described above, and FIG. 7$c$ shows the state of variation of the opening or operating position of the throttle valve 125 due to impartation of control thereto.

At time $t_1$ when the vehicle begins to run on an upward slope, the vehicle speed starts to reduce so that the differential amplifier is urged to its unbalanced state and the servomotor 121 starts to move the throttle valve 125 in the opening direction. By the movement of the throttle valve 125 in its opening direction, the third signal appears to restore the differential amplifier to its balanced position whereby the throttle valve 125 is stopped at a position at which it is slightly urged in its opening direction from the previous position. Because of a further continuous reduction of the vehicle speed, the throttle valve 125 makes three opening movements between time $t_1$ and time $t_2$ as shown in FIG. 7$c$. and the control therefor has been completed before time $t_3$ at which the vehicle speed is restored to its predetermined speed setting. Entirely the same operation as above takes place when the vehicle going to a flat road from an upward slope begins to run on a flat road portion although the direction of control for the throttle valve 125 is reverse to the above case. More precisely, the manner of control in the apparatus according to the present invention is such that, during the movement of the throttle valve 125 in its opening direction, for example, the control therefor is prematurely ceased by preestimating that the vehicle speed would start to increase after a certain delay time. By virtue of the employment of such a preestimated control, an undesirable hunting in the control can be avoided, in which the throttle valve 125 is continuously opened to an excessively largely opened position in the region between the time $t_1$ and the time $t_3$ where the vehicle speed is lower than the predetermined speed setting, and as a result, the vehicle speed is excessively increased to an extent that the control for the throttle valve 125 in the reverse direction must be made, which reverse control may then close the throttle valve 125 more than is desired.

Figure 8A:
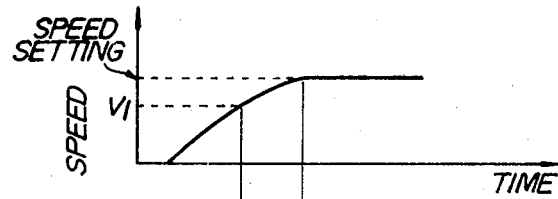
FIG. 8a and FIG. 8b are graphs illustrating another manner of operation of the apparatus shown in FIG. 3.

In FIG. 8, there is shown an operating characteristic of an automotive vehicle having a torque converter with which the apparatus according to the present invention is combined. FIG. 8$a$ shows the state of variation of the vehicle speed from the starting position, and FIG. 8$b$ shows the state of variation of the opening of the throttle valve 125.

In such a case, the vehicle speed at starting time is very low compared with the predetermined speed setting, and the throttle valve 125 is first opened to its full throttle position. The third signal generated in response to the above opening of the throttle valve 125 has a very large magnitude, and therefore the differential amplifier will be balanced by such a value of the first signal which corresponds to a considerably low value of the vehicle speed. Suppose now that the balancing condition of the differential amplifier is satisfied by the value of the first signal which corresponds to a vehicle speed $v_1$ at time $t_2$, then any further increase in the vehicle speed after the time $t_2$ will urge the differential amplifier to be unbalanced in the reversed direction thereby moving the throttle valve 125 in its closing direction.

Figure 8B:
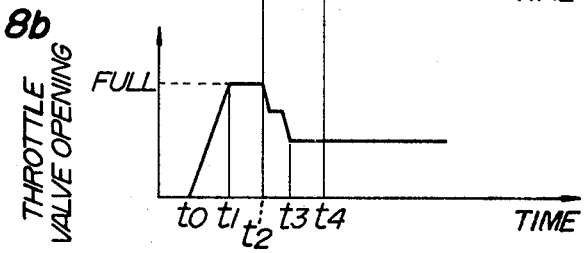

Due to the movement of the throttle valve 125 in its closing direction, the third signal is decreased in its magnitude and the balance point is shifted toward the predetermined speed setting, with the acceleration of the vehicle speed being gradually decreased in spite of a further increase in the vehicle speed. In FIG. 8b it will be seen that two times of successive operation for the closing control of the throttle valve 125 are effected until the throttle valve 125 is set at an angular position at which the vehicle runs stably at the predetermined speed setting. The necessary control for the throttle valve 125 has been completed at time $t_3$ before time $t_4$ at which the steady run of the vehicle at the predetermined speed setting is started.

In the above case too, a preestimated control similar to the case of FIG. 7 is performed. More precisely, the throttle valve 125 is first urged to its full throttle position between the time $t_1$ and the time $t_2$ in order to quickly increase the vehicle speed toward the predetermined speed setting. Since, however, quick closure of the throttle valve 125 at such a time that the vehicle speed has reached the predetermined speed setting with the throttle valve 125 being left in its full throttle position may be too late and the vehicle speed may greatly exceed the speed setting, the third signal is applied to move the throttle valve 125 in the reverse or closing direction at the value $v_1$ of the vehicle speed at the time $t_2$ at which the vehicle speed is still lower than the speed setting. The above manner of operation is based on preestimation that initiation of the closing operation of the throttle valve 125 at the time $t_2$ with the vehicle speed $v_1$ would smoothly settle the vehicle speed at the desired speed setting when time $t_4$ is reached.

The apparatus according to the present invention is naturally equipped with limit switches which are operative to prevent the movement of the throttle valve 125 beyond its full throttle position when the throttle valve 125 is urged to such a position by the servomotor 121 and to prevent the movement of the throttle valve 125 beyond its zero throttle position when the throttle valve 125 is urged in the opposite or closing direction by the servomotor 121. However, no description in this connection will be given herein because the operation of the limit switch is well known in the art.

Figure 6:
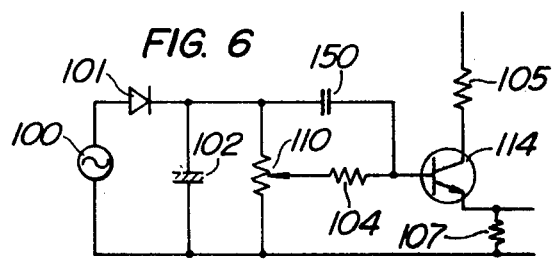
FIG. 6 is a circuit diagram illustrating one practical form of means for deriving an acceleration responsive signal in the apparatus shown in FIG. 2.

In the embodiments described hereinbefore, a variation in the operating position of the drive motor output regulating means is utilized to generate the third signal, but it will be understood that the effect substantially similar to the above may be attained by utilizing acceleration of the vehicle running speed for the generation of the third signal. An automatic speed control apparatus representing this form of third signal derivation may be obtained by replacing the circuit portion lying on the left-hand side of the transistor 114, inclusive, in FIG. 3 by a circuit shown in FIG. 6 and by eliminating the variable resistor 112, resistor 109 and capacitor 124 in the circuit portion provided for the derivation of the third signal of the kind referred to previously. A circuitry thereby obtained corresponds to a practical circuit of the block diagram in FIG. 2. In this circuit, the reference or second signal is derived from the variable resistor 111 and is free from the effect of third signal. The first signal derived from he middle point of a vehicle speed-setting variable resistor 110 is applied through a resistor 104 to the base of a transistor 214 in a differential amplifier, and at the same time, a DC voltage proportional to the vehicle speed which appears across the variable resistor 110 is applied across a capacitor 150 so that a signal representing its variation or the differentiated value of the vehicle speed, that is, the value of acceleration is applied to the base of the transistor 114 in a superposed relation with the first signal.

Suppose now that the vehicle speed is lower than the predetermined speed setting and the apparatus of the present invention is thereby actuated to move the throttle valve 125 in its opening direction for increasing the vehicle speed. Since, in the above situation, the acceleration has already a certain value in spite of the fact that the vehicle speed is still lower than the predetermined speed setting, the magnitude of the signal which is the sum of the vehicle speed signal or the first signal and the acceleration signal is near the predetermined speed setting and the differential amplifier is restored to its balanced state before the vehicle speed reaches the speed setting. It is thus possible to effect a preestimated control of the kind similar to the case of FIG. 3.

In the previous method of deriving the third signal in the form which represents a variation in the opening or operating position of the throttle valve, an increase in the vehicle speed is preestimated at the time of, for example, moving the throttle valve in its opening direction, while in the method of deriving the third signal in the form which represents acceleration of the vehicle speed, an increase in the vehicle speed is not preestimated until the throttle valve is moved in its opening direction to cause a variation in the vehicle speed, hence, acceleration of the vehicle. In view of the above manner of preestimation, the time of preestimation in the latter method is later by one step than in the former method and a delayed control may thereby result, but the latter method may be advantageous over the former method in that it provides useful means for obtaining a more positive preestimation signal. Therefore, a composite control system which employs both the former method and the latter method therein, that is, a control system in which the acceleration detector 16 and the associated connecting lines in the block diagram shown in FIG. 2 are incorporated in the block diagram shown in FIG. 1 may by employed so as to compensate for the respective drawbacks of these two control systems and to thereby realize a more ideal control.

Figure 11:
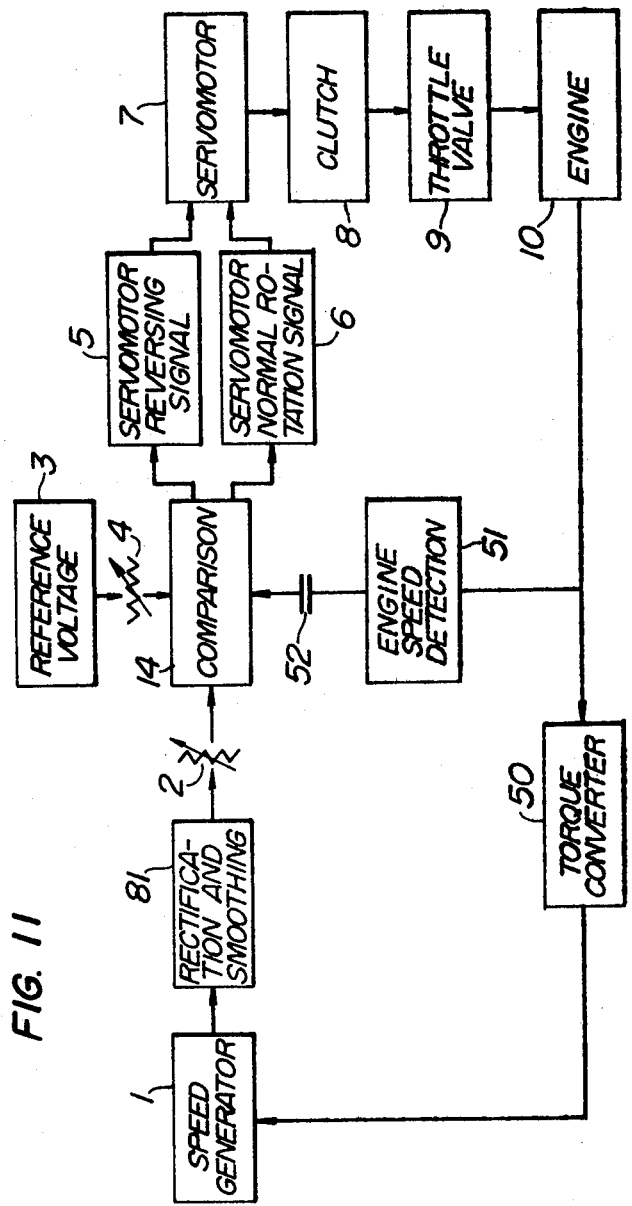
FIG. 11 is a block diagram illustrating another embodiment of the apparatus according to the present invention.

In FIG. 11 there is shown another embodiment of the present invention in which the third signal is derived in the form which presents the rotational speed of the engine. In this case too, the effect similar to the previous embodiments can be expected. More precisely, FIG. 11 is a block diagram of an automatic vehicle speed control apparatus adapted for an automotive vehicle equipped with a torque converter. In the apparatus shown in FIG. 11, power delivered from an engine 10 is transmitted to a torque converter 50. Since the torque converter 50 itself has some delay time factor in its output relative to its input, employment of the third signal in the form which represents the rotational speed of the engine 10 may be preferable in order to effect a more appropriate automatic control.

More practically, means 51 for detecting the rotational speed of the engine 10 may comprise an AC generator directly coupled to the engine 10 and a circuit for the rectification and smoothing of the output of the AC generator so that a DC voltage proportioned to the rotational speed of the engine 10 can thereby be obtained. Therefore, in lieu of the signal delivered from the acceleration detection circuit in the apparatus shown in FIG. 2, the third signal which is a DC voltage signal representative of the rotation speed of the engine 10 may be supplied from the engine speed detecting means 51 through a capacitor 52 to a comparison means 14 in such a manner that the third signal is superposed on the first signal which is representative of the vehicle speed. An increase in the rotational speed of the engine in this arrangement is apparently equivalent to an increase in the vehicle speed as will be understood from the previous description. The interposition of the capacitor 52 is effective in that solely a variation in the DC voltage is transmitted as the third signal, and the third signal as such does not exert any influence on the first signal and the second or reference signal in the steady running state of the vehicle in which the vehicle speed is steadied at the predetermined speed setting and the r.p.m. of the engine is constant. It will be understood that the present embodiment in which any variation in the engine rotation speed is utilized to derive the third signal exhibits a performance similar to that exhibits a performance similar to that exhibited by the previous embodiments shown in FIGS. 1 and 2 in which the third signal is derived as representative of any variation in the throttle valve opening and any variation IN THE ACCELERATION, RESPECTIVELY.

Figure 9:
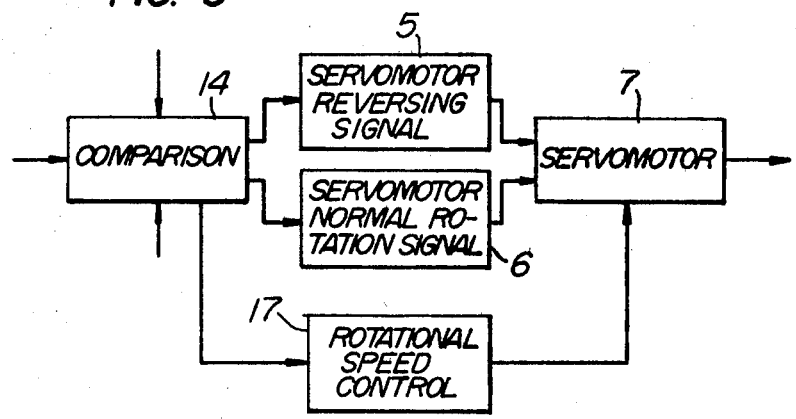
FIG. 9 is a block diagram illustrating a part of another embodiment of the apparatus according to the present invention.

In the various forms of the speed control apparatus described above, no control is specifically applied to the rotational speed of the servomotor itself during its operation, hence, the opening and closing speed of the throttle valve, and the intermittent drive of the servomotor is utilized to effect the resultant control of the mean moving speed of the throttle valve. However, the desired automatic vehicle speed control can more smoothly be attained by positively controlling the moving speed of the throttle valve. MOre precisely, the desired smooth control of the vehicle speed can be attained by arranging in such a manner that a rotational speed control signal obtained by taking a difference between the magnitudes of the first signal and the second signal and by shifting the difference signal by the third signal may be derived from the comparison means 14 shown in FIG. 1 or 2 for application to the servomotor 7 for the control of the rotational speed thereof, instead of the on-off signal supplied from the comparison means 14 to the servomotor normal rotation means 6 and the servomotor reversing means 5 cause the normal rotation and reverse rotation of the servomotor 7. In accordance with such an arrangement, a very slight variation in the running speed may be compensated for by a very slight correction of the opening of the throttle valve 9 which, in such a case, is actuated at a slow speed to the smooth control of the vehicle speed, while where a large variation in the running speed is to be corrected, the throttle valve 9 is rapidly moved in order to effect quick recovery of the running speed. Such an operation of the throttle valve can be performed by a control system as shown in FIG. 9. The system shown in FIG. 9 is so arranged that, in addition to the supply of the on-off signal from a comparison means as 14 of the selective actuation of a normal rotation means 6 and a reversing means 5, a signal which is representative of the magnitude of the difference between the first signal and the second signal and is then shifted in its valve by the third signal is derived from the comparison means 14 and is used to control a rotational speed control means 17 for the control of the rotational speed of a servomotor 7. Other parts of the control system shown in FIG. 9 are entirely same as those appearing in FIG. 1 or 2.

Figure 10:
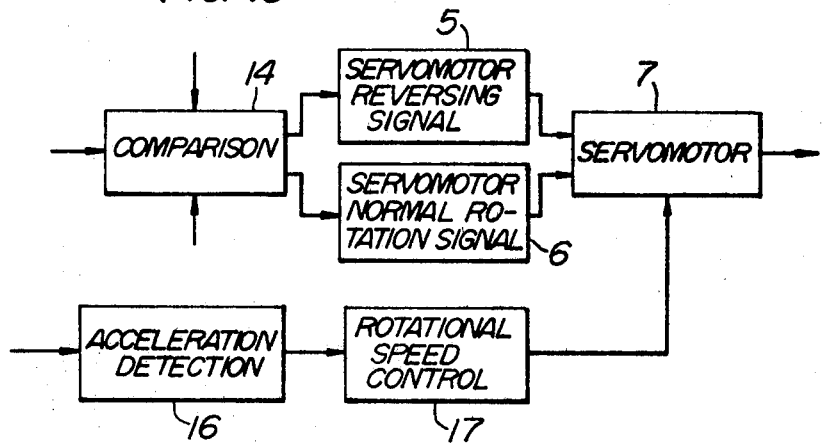
FIG. 10 is a block diagram illustrating a part of a further embodiment of the apparatus according to the present invention.

The function similar to the above may be obtained by making use of an acceleration signal for the control of the opening or closing speed of the throttle valve 9. A system suitable for this purpose is illustrated in FIG. 10, in which a signal delivered from an acceleration detector 16 is used to control a rotational speed control means 17 in order to control the rotational speed of a servomotor 7 depending on the magnitude of acceleration. According to this arrangement, the throttle valve 9 is opened at a higher speed when the vehicle speed tends to deviate from the speed setting at a faster rate, that is, when acceleration is greater, while the throttle valve 9 is opened at a correspondingly slow speed when the acceleration is little. In this manner, the desired smooth and quick control of the vehicle speed can be attained. The signal used for the open-close speed control of the throttle valve may comprises both a signal obtained by taking a difference between the first and second signals and by shifting the difference signal by means of the third signal and the acceleration signal referred to in the above so as to realize a smoother and quicker control of vehicle speed.

Although a differential amplifier has been illustrated herein by way of example to constitute the comparison mean of two signals, it will be understood that the comparison means in the apparatus according to the present invention is in on way limited to the differential amplifier and may be a conventional bridge circuit, a transistor bridge circuit utilizing an additional amplifying action of transistors, or any other circuit which can compare the relative magnitude of two signals.

The present invention has been described with reference to specific embodiments thereof, but is will be understood that the present invention is in no way limited to such specific embodiments and various modifications and changes may be made therein without departing from the spirit of the present invention and the scope of claims appended hereto.

We claim:

1. An automatic speed control apparatus for automotive vehicles comprising means for generating a first signal representative of the running speed of an automotive vehicle, means for generating a second signal which is a reference signal having a fixed magnitude, means for varying the magnitude of at least one of said first signal and said second signal in accordance with predetermined speed setting, means for detecting the difference between said two signals after at least one has been varied in accordance with said predetermined speed setting, means for shifting the value of the signal which is representative of the difference between said two signals by applying thereto a third signal obtained by detecting at least one of the values of a variation in the positional operation of motor output regulating means, a variation in the rotational speed of the engine, and acceleration of the vehicle each of which has the absolute value thereof eliminated and means for controlling the motor output regulating means depending on the value of said shifted signal.

2. A automatic speed control apparatus according to claim 1, further comprising a source of light, photoelectrical conversion means, and light shielding means operative in response to the operating position of said motor output regulating means to vary a quantity of light emitted from said source of light toward said photoelectrical conversion means, and said third signal is a signal representative of a variation in the operating position of said motor output regulating means derived by applying a voltage delivered from said photoelectrical conversion means across a capacitor.

3. An automatic speed control apparatus according to claim 1, wherein a control speed for said means for controlling the motor output regulating means is derived from said first signal.

4. An automatic speed control apparatus according to claim 3, wherein said signal derived from said first signal is representative of acceleration.

5. An automatic speed control apparatus according to claim 1, wherein a control speed for said means for controlling the motor output regulating means is derived from the magnitude of said difference signal between said first signal and said second signal after having been shifted by said third signal.

6. An automatic speed control apparatus according to claim 1, in which said third signal is obtained by converting the operating position of said motor output regulating means to a voltage signal and differentiating said voltage signal across a capacitor to eliminate the absolute value thereof.

7. An their speed control apparatus according to claim 1, in which the third signal is a combination of the resultant values of a variation in the positional operation of the motor output regulating means and acceleration of the vehicle, after their absolute values are removed.

8. An automatic speed control apparatus according to claim 1 wherein a control speed for said means for controlling the motor output regulating means is derived from a combined signal of a difference between said first signal and second signal shifted and a signal representative of acceleration.

9. An automatic speed control apparatus for automotive vehicles comprising means for generating a first signal representative of the running speed of an automotive vehicle, means for differentiating said first signal to thereby deliver a signal representative of acceleration, means for generating a second signal which is a reference signal having a fixed magnitude, means for varying the magnitude of at least one of said first signal and said second signal in accordance with a predetermined speed setting, means of detecting the difference between a signal, which is the sum of said first signal after having been varied in accordance with said predetermined speed setting and said signal representative of the acceleration, and said second signal after having been varied in accordance with said predetermined speed setting, and means for controlling motor output regulating means depending on the value of said detected difference signal.